(12) United States Patent
Marsh et al.

(10) Patent No.: US 9,333,965 B2
(45) Date of Patent: May 10, 2016

(54) CONTROL STRATEGY FOR OPERATING A LOCKING DIFFERENTIAL

(71) Applicant: American Axle & Manufacturing, Inc., Detroit, MI (US)

(72) Inventors: Gregory A. Marsh, Ferndale, MI (US); Russell T. Capito, Clarkston, MI (US); John C. Hibbler, Lake Orion, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 131 days.

(21) Appl. No.: 14/208,316

(22) Filed: Mar. 13, 2014

(65) Prior Publication Data

US 2014/0213412 A1    Jul. 31, 2014

Related U.S. Application Data

(63) Continuation of application No. 13/094,976, filed on Apr. 27, 2011, now abandoned.

(60) Provisional application No. 61/329,854, filed on Apr. 30, 2010.

(51) Int. Cl.
| | |
|---|---|
| *B60W 10/12* | (2012.01) |
| *F16H 48/30* | (2012.01) |
| *B60W 10/20* | (2006.01) |
| *B60K 17/346* | (2006.01) |

(Continued)

(52) U.S. Cl.
CPC ............... *B60W 10/12* (2013.01); *B60W 10/20* (2013.01); *F16H 48/30* (2013.01); *B60K 17/3465* (2013.01); *F16H 48/24* (2013.01); *F16H 2048/204* (2013.01); *Y10T 477/606* (2015.01)

(58) Field of Classification Search
CPC ........... B60K 23/0808; B60K 23/0816; B60K 23/085; B60K 28/165; B60K 17/346; B60K 17/3462; B60K 17/3465; B60W 10/12; B60W 10/14; B60W 10/16; F16H 48/30; F16H 48/24; F16H 2048/204
USPC ................. 180/233, 245, 246, 248, 249, 250; 475/231, 254, 269; 701/69, 88; 477/35
See application file for complete search history.

(56) References Cited

U.S. PATENT DOCUMENTS

| | | | |
|---|---|---|---|
| 4,681,185 | A | 7/1987 | Hoernig et al. |
| 5,102,378 | A | 4/1992 | Gobert |

(Continued)

FOREIGN PATENT DOCUMENTS

| | | |
|---|---|---|
| CA | 2240057 C | 1/2001 |
| JP | 63251327 A | 10/1988 |
| WO | WO-2005047050 A1 | 5/2005 |

*Primary Examiner* — Anne Marie Boehler
(74) *Attorney, Agent, or Firm* — Harness, Dickey & Pierce, P.L.C.

(57) ABSTRACT

A drive train having a locking differential and a control unit for controlling operation of the locking differential. The control unit is responsive to selected vehicle characteristics to sua sponte activate or inactivate a locking mechanism of the locking differential to cause the locking differential to operate in a locked manner or an unlocked manner, respectively. A method for operating a locking differential is also provided. The method includes: utilizing only preselected vehicle criteria indicative of the operational state of the vehicle to identify a situation in which a locking mechanism associated with the locking differential is to be energized; and responsively energizing the locking mechanism.

9 Claims, 4 Drawing Sheets

(51) Int. Cl.
*F16H 48/24* (2006.01)
*F16H 48/20* (2012.01)

(56) References Cited

U.S. PATENT DOCUMENTS

| | | | |
|---|---|---|---|
| 5,125,490 A | 6/1992 | Suzumura et al. | |
| 5,289,895 A | 3/1994 | Takata et al. | |
| 5,314,378 A | 5/1994 | Ohtagaki et al. | |
| 5,332,059 A * | 7/1994 | Shirakawa | B60K 23/04 |
| | | | 180/197 |
| 5,388,895 A | 2/1995 | Negrin | |
| 5,437,586 A | 8/1995 | Kashiwagi | |
| 5,450,919 A | 9/1995 | Shitani | |
| 5,479,348 A | 12/1995 | Sasaki | |
| 5,519,615 A | 5/1996 | Schob et al. | |
| 5,570,755 A | 11/1996 | Fruhwirth et al. | |
| 5,574,643 A | 11/1996 | Yesel | |
| 5,644,490 A | 7/1997 | Weber | |
| 5,671,144 A | 9/1997 | Ryan et al. | |
| 5,719,770 A | 2/1998 | Matsuno | |
| 5,752,211 A * | 5/1998 | Takasaki | B60K 23/0808 |
| | | | 180/197 |
| 5,897,601 A | 4/1999 | Suzuki | |
| 5,995,895 A | 11/1999 | Watt et al. | |
| 6,009,969 A | 1/2000 | Salcher et al. | |
| 6,038,506 A | 3/2000 | Diekhans et al. | |
| 6,076,033 A | 6/2000 | Hamada et al. | |
| 6,101,434 A | 8/2000 | Irie et al. | |
| 6,112,146 A | 8/2000 | Mueller | |
| 6,169,951 B1 | 1/2001 | Ghoneim et al. | |
| 6,189,643 B1 | 2/2001 | Takahashi et al. | |
| 6,224,171 B1 | 5/2001 | Riedemann et al. | |
| 6,275,762 B1 | 8/2001 | Salg | |
| 6,364,301 B1 | 4/2002 | Takahashi | |
| 6,393,351 B2 | 5/2002 | Frediani et al. | |
| 6,432,020 B1 | 8/2002 | Rivera et al. | |
| 6,473,712 B1 | 10/2002 | Faye et al. | |
| 6,487,486 B1 | 11/2002 | Anderson | |
| 6,524,207 B2 | 2/2003 | Murakami et al. | |
| 6,564,139 B2 | 5/2003 | Sakakiyama | |
| 6,584,398 B1 | 6/2003 | Erban | |
| 6,593,849 B2 | 7/2003 | Chubb et al. | |
| 6,678,631 B2 | 1/2004 | Schiffmann | |
| 6,701,224 B1 | 3/2004 | Klusemann | |
| 6,747,553 B2 | 6/2004 | Yamada et al. | |
| 6,758,087 B2 | 7/2004 | Balch et al. | |
| 6,820,712 B2 | 11/2004 | Nakamura | |
| 6,830,122 B2 | 12/2004 | Kroppe | |
| 6,834,217 B2 | 12/2004 | Erban | |
| 6,840,587 B2 | 1/2005 | Eberle et al. | |
| 6,878,085 B2 | 4/2005 | Matsuno | |
| 6,909,959 B2 * | 6/2005 | Hallowell | B60K 6/52 |
| | | | 701/88 |
| 6,996,466 B2 | 2/2006 | Bastian et al. | |
| 7,007,763 B2 | 3/2006 | Ginther et al. | |
| 7,031,819 B2 | 4/2006 | Hack et al. | |
| 7,162,346 B2 | 1/2007 | Berry et al. | |
| 7,211,020 B2 | 5/2007 | Gohl et al | |
| 7,263,424 B2 | 8/2007 | Motoyama | |
| 7,290,634 B2 | 11/2007 | Clare et al. | |
| 7,325,640 B2 * | 2/2008 | Ushiroda | B60K 23/0808 |
| | | | 180/248 |
| 7,377,600 B2 | 5/2008 | Motoyama | |
| 7,386,383 B2 | 6/2008 | Yoneda et al. | |
| 7,553,255 B2 | 6/2009 | Torres et al. | |
| 7,590,481 B2 | 9/2009 | Lu et al. | |
| 7,641,585 B2 | 1/2010 | Baldet | |
| 7,654,934 B2 | 2/2010 | Alfredson | |
| 7,666,116 B2 | 2/2010 | Scheer et al. | |
| 7,680,576 B2 | 3/2010 | Nagura et al. | |
| 7,801,657 B2 | 9/2010 | Piyabongkarn et al. | |
| 2005/0026732 A1 | 2/2005 | Krisher et al. | |
| 2005/0288842 A1 | 12/2005 | Brewer et al. | |
| 2007/0158126 A1 | 7/2007 | Baldet | |
| 2007/0184929 A1 | 8/2007 | Piyabongkarn et al. | |
| 2007/0213913 A1 | 9/2007 | Ushiroda et al. | |
| 2007/0260382 A1 | 11/2007 | Frey et al. | |
| 2008/0090688 A1 | 4/2008 | Torres et al. | |
| 2008/0182702 A1 * | 7/2008 | Donofrio | B60K 23/04 |
| | | | 475/235 |
| 2008/0255735 A1 * | 10/2008 | Marathe | B60K 28/165 |
| | | | 701/50 |
| 2011/0082634 A1 * | 4/2011 | Povirk | B60K 17/344 |
| | | | 701/88 |

* cited by examiner

CONTROL STRATEGY FOR OPERATING A LOCKING DIFFERENTIAL

CROSS-REFERENCE TO RELATED APPLICATIONS

This application is a continuation of U.S. application Ser. No. 13/094,976 filed on Apr. 27, 2011 (now abandoned), which claims the benefit of U.S. Provisional Application Ser. No. 61/329,854, filed on Apr. 30, 2010. The entire disclosure of each of the above applications is incorporated herein by reference as if fully set forth in detail herein.

FIELD

The present disclosure relates to a control strategy for a locking differential and a drive train incorporating same.

BACKGROUND

This section provides background information related to the present disclosure which is not necessarily prior art.

Examples of locking differentials are described in U.S. Pat. Nos. 7,022,040, 7,425,185, and 7,572,202. It is common for such locking differentials to be controlled via manual actuation of a switch by the operator of a vehicle. There remains a need in the art for a control strategy for operating a locking differential that provides additional flexibility in the locking and/or unlocking of the differential.

SUMMARY

This section provides a general summary of the disclosure, and is not a comprehensive disclosure of its full scope or all of its features.

In one form the present teachings provide a drive train having a locking differential and a control unit for controlling operation of the locking differential. The control unit is responsive to selected vehicle characteristics to sua sponte activate or inactivate a locking mechanism of the locking differential to cause the locking differential to operate in a locked manner or an unlocked manner, respectively.

In another form, the present disclosure provides a method for operating a locking differential. The method includes: utilizing only preselected vehicle criteria indicative of the operational state of the vehicle to identify a situation in which a locking mechanism associated with the locking differential is to be energized; and responsively energizing the locking mechanism. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
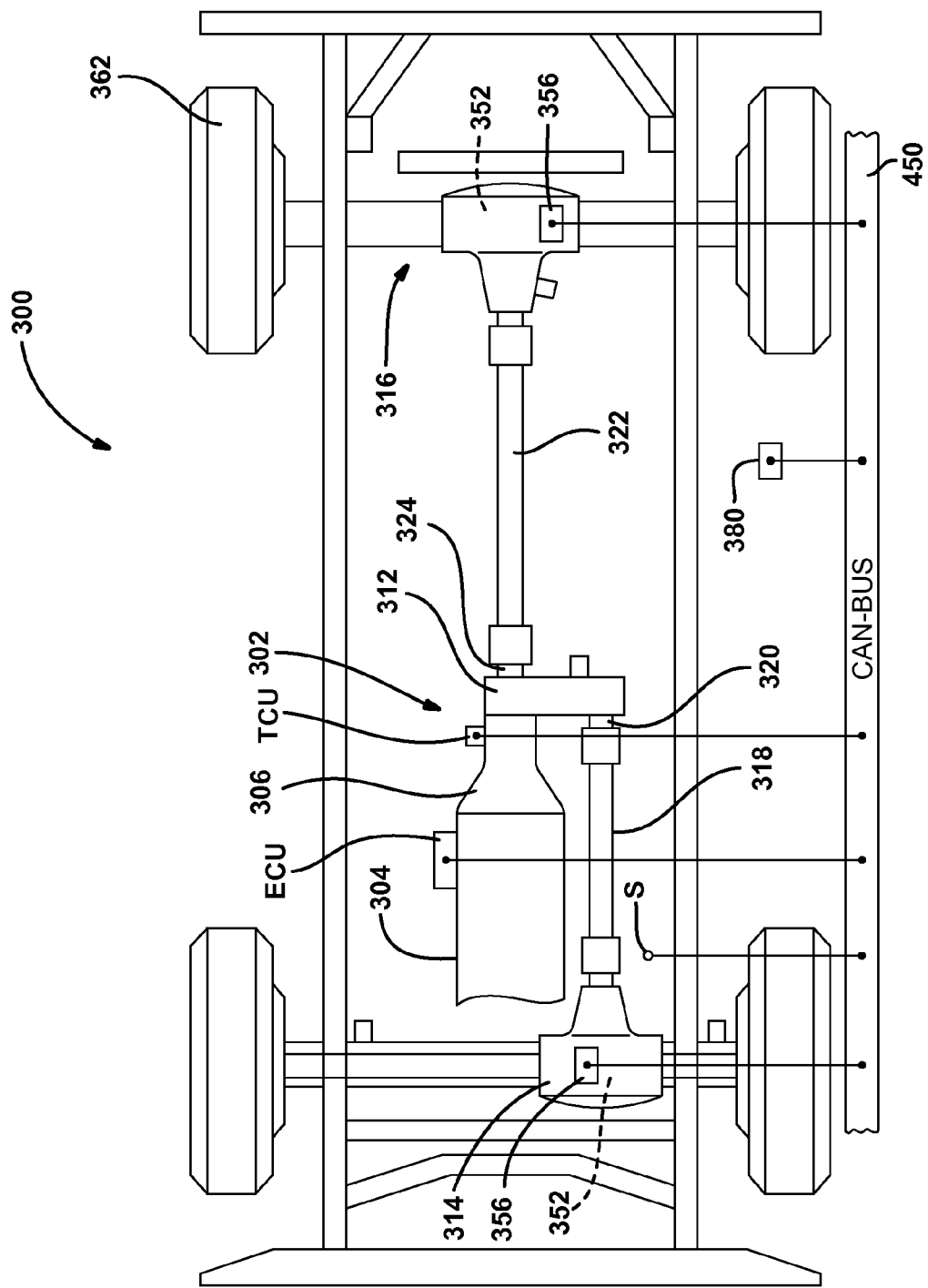
FIG. 1 is a schematic illustration of a vehicle constructed in accordance with the teachings of the present disclosure.

With reference to FIG. 1, a motor vehicle constructed in accordance with the teachings of the present disclosure is generally indicated by reference numeral 300. The motor vehicle 300 is illustrated to include a drive train 302 that can include a power source 304, such as an internal combustion engine, and a transmission 306 that can provide rotary power to the drive train 302 in a manner that is well known in the art. In the example provided, the drive train 302 includes a transfer case 312, a first or front axle assembly 314, a second or rear axle assembly 316, a first propeller shaft 318, which conventionally couples the front axle assembly 314 to a front output shaft 320 of the transfer case 312, and a second propeller shaft 322 that conventionally couples the rear axle assembly 316 to a rear output shaft 324 of the transfer case 312. The transfer case 312 can receive rotary power from the transmission 306 and can distribute rotary power to the front and rear axle assemblies 314 and 316 in a desired manner.

The transfer case 312 is operable to selectively provide drive torque in a two-wheel drive mode or a four-wheel drive mode. In the two-wheel drive mode, torque is transferred to the rear axle assembly via the transmission 306. Accordingly, 100% of the drive torque delivered by the transmission 306 is provided to the rear axle assembly 316. In the four-wheel drive mode, power is transferred through the transfer case 312 to supply drive torque to the front axle assembly 314. In some examples, a four-wheel drive "high" mode and a four-wheel drive "low" mode may be provided. In a four-wheel drive "low" mode, the transmission 306 may be configured to transmit power solely in one or more high torque gears.

Figure 2:
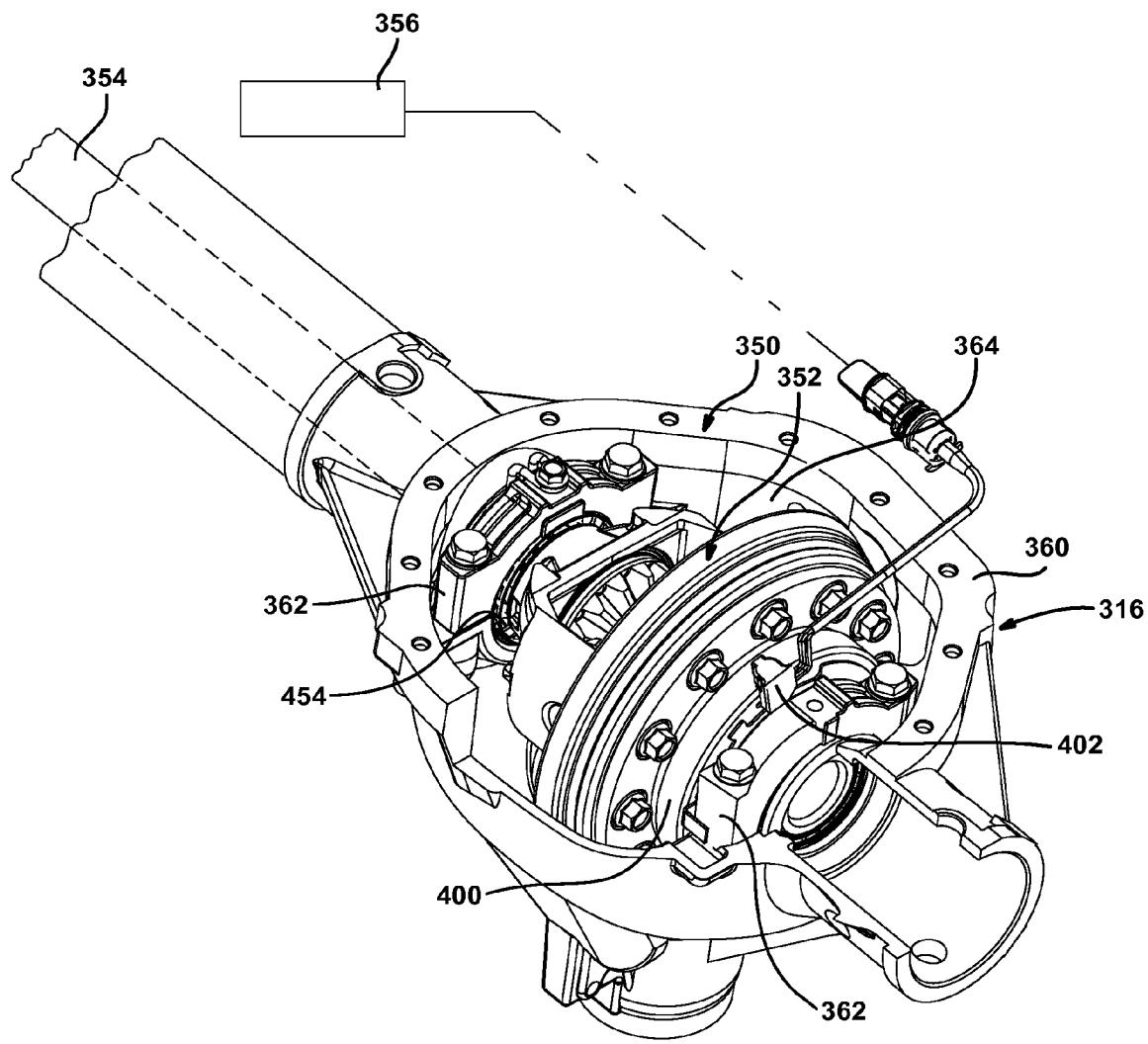
FIG. 2 is an exploded perspective view of a portion of the vehicle of FIG. 1, illustrating the rear axle assembly in greater detail.

The front and rear axle assemblies 314 and 316 can be similar in their construction and operation and as such, only the rear axle assembly 316 will be discussed in detail herein. With additional reference to FIG. 2, the rear axle assembly 316 can include an axle housing 350, a differential assembly 352, a pair of axle shafts 354 (only one of which is specifically shown), and a control unit 356. The axle housing 350 can be conventionally configured and can include a housing structure 360 and a pair of bearing caps 362 that can be fixedly but removably coupled to the housing structure 360. The housing structure 360 can define a differential cavity 364 that houses the differential assembly 352. The bearing caps 362 can be decoupled from the housing structure 360 to permit the differential assembly 352 to be received within the differential cavity 364. The axle shafts 354 can be coupled to opposite sides of the differential assembly 352 and to respective ones of the rear vehicle wheels 362 (FIG. 1) in any appropriate manner. The differential assembly 352 can be any type of locking differential assembly that can be selectively operated in an open manner and a locked manner. Exemplary differential assemblies are disclosed in U.S. Pat. Nos. 7,022,040, 7,425,185, and 7,572,202, the disclosures of which are hereby incorporated by reference as if fully set forth in detail herein. Those of skill in the art will appreciate that operation of the differential assembly 352 in the open manner permits the transmission of rotary power that is received by the rear axle assembly 316 via the second propeller shaft 322 to the axle shafts 354 in a manner that permits speed differentiation, while operation of the differential assembly 352 in the locked manner permits the transmission of rotary power that is received by the rear axle assembly 316 to the axle shafts 354 in a manner that does not permit speed differentiation between the axle shafts 354.

The control unit 356 can be configured to monitor and control the operation of the differential assembly 352. The control units 356 can communicate with a locking mechanism or actuator 400, which is configured to control the operational state of the differential assembly 352, one or more sensors 402, which is/are configured to sense a parameter indicative of the operational state of the differential assembly 352, and to various other controllers incorporated into the vehicle 300, which can facilitate the exchange of vehicle data between the control units 356 and the other controllers. In the particular example provided, the vehicle 300 includes a CAN-bus 450 that links the control units 356 to an engine control unit ECU, and a transmission control unit TCU, but it will be appreciated that various other types of communication systems may be employed and that the control units 356 can communicate with more or fewer vehicle controllers as desired.

The control unit 356 can generate a locking command that can be generated responsive to a locking request or automatically in response to a control methodology in accordance with the teachings of the present disclosure. The locking request can be generated manually by an operator of the vehicle 300 (e.g., in response to a control signal generated by operation of one or more manually-actuated switches S and/or in response to the transfer case 312 being shifted into a particular mode, i.e., four-wheel drive low). The locking request may be employed to directly and immediately generate the locking command, or one or both of the control units 356 can be employed to determine whether generation of the locking command should be permitted under the present circumstances. For example, the locking request may be generated at a time when it may not be particularly advantageous to operate one or more of the differential assemblies 352 in the locked manner. Exemplary circumstances may include situations where the speed of the wheels associated with a given axle assembly are rotating at vastly different rotational speeds, or where the transmission 306 of the vehicle 300 is operating in a selected speed ratio (e.g., an overdrive speed ratio).

The control units 356 can alternatively or additionally generate the locking command automatically and on their own initiative (i.e., sua sponte) based on various vehicle criteria. For example, variables including throttle position, yaw angle (or yaw rate), steering angle, engine/transmission torque, vehicle acceleration, vehicle speed, vehicle slope estimate, wheel slip and electronic stability control status, can be employed to identify situations in which it would be advantageous to operate one or more of the differential assemblies 352 in a locked manner. Table 1, below, provides exemplary values for select parameters employed by the control units 356 to sua sponte generate the locking command.

TABLE 1

| Vehicle Characteristic For Sua Sponte Generation of Locking Command | Threshold Min Value | Threshold Max Value |
|---|---|---|
| Throttle Position | | 12% |
| Steering Wheel Angle (Vehicle in Fwd Direction) | | 1.57 rad |
| Steering Wheel Angle (Vehicle in Rev Direction) | | 0.78 rad |

TABLE 1-continued

| Vehicle Characteristic For Sua Sponte Generation of Locking Command | Threshold Min Value | Threshold Max Value |
|---|---|---|
| Wheel Slip | 0.35 m/s | 2.00 m/s |
| Vehicle Acceleration | 1.2 m/s$^2$ | 20 m/s$^2$ |
| Vehicle Speed | | 8.9 m/s |
| Yaw | | 0.2 rad/s |

It will be appreciated from this disclosure that a control methodology in accordance with the teachings of the present disclosure may be configured such that all criteria for sua sponte generation of the locking command must be met. In the example provided, all of the following criteria must be met: the throttle position of the vehicle 300 is less than 12% (of full throttle); the steering wheel angle is less than 1.57 radians or less than 0.78 radians, depending on whether the vehicle 300 is traveling in the forward direction or the reverse direction, respectively; the wheel slip of any of the associated vehicle wheels exceeds 0.35 meters/second but is less than 2.00 meters/second; the acceleration of the vehicle 300 is between 1.2 meters/second squared and 20 meters/second squared; the speed of the vehicle 300 is less than 8.9 meters/second; and the yaw of the vehicle 300 is less than 0.2 radians/second.

It will be appreciated that the locking command may be removed manually (e.g., operating the one or more manually-actuated switches S to withdraw the lock request, which can cause the control units 356 to responsively withdraw the locking command) and/or automatically by the control units 356. For example, variables including throttle position, yaw angle (or yaw rate), steering angle, engine/transmission torque, vehicle acceleration, vehicle speed, vehicle slope estimate, wheel slip and electronic stability control status, can be employed to identify situations in which it may be desirable to operate one or more of the differential assemblies 352 in an unlocked manner. These variables, corresponding to vehicle characteristics, may be obtained by, for example, various vehicle sensors 380. Table 2, below, provides exemplary values for select parameters employed by the control units 356 to sua sponte withdraw the locking command.

TABLE 2

| Vehicle Characteristic For Sua Sponte Withdrawal of Locking Command | Threshold Min Value | Threshold Max Value |
|---|---|---|
| Throttle Position | | 12% |
| Steering Wheel Angle (Vehicle in Fwd Direction) | | 1.57 rad |
| Steering Wheel Angle (Vehicle in Rev Direction) | | 0.78 rad |
| Wheel Slip | 0.35 m/s | 2.00 m/s |
| Vehicle Acceleration | 1.2 m/s$^2$ | 20 m/s$^2$ |
| Vehicle Speed | | 10.22 m/s |
| Yaw | | 0.2 rad/s |

It will be appreciated from this disclosure that a control methodology in accordance with the teachings of the present disclosure may be configured such that the meeting of any criteria for sua sponte withdrawal of the locking command will cause a withdrawal of the locking command. In the example provided, the locking command is withdrawn if any of the following criteria is met: the throttle position of the vehicle 300 is greater than or equal to 12% (of full throttle); the steering wheel angle is greater than or equal to 1.57 radians or greater than or equal to than 0.78 radians, depending on whether the vehicle 300 is traveling in the forward direction or the reverse direction, respectively; the wheel slip of any of the associated vehicle wheels does not exceed 0.35 meters/second or is greater than or equal to 2.00 meters/second; the acceleration of the vehicle 300 is less than or equal to 1.2 meters/second squared or greater than or equal to 20 meters/second squared; the speed of the vehicle 300 is greater than or equal to 10.22 meters/second; and the yaw of the vehicle 300 is greater than or equal to 0.2 radians/second.

It will be appreciated that various vehicle data, including vehicle acceleration, wheel acceleration, vehicle speed, vehicle acceleration, wheel slip, yaw angle, yaw rate, direction of travel, engine/transmission torque, throttle position, vehicle slope estimate and steering wheel angle may be obtained from one or more of the other vehicle controllers (e.g., over the CAN-bus 450 from the engine control unit ECU or the transmission control unit TCU), but it may be advantageous in some situations to receive "raw" data from the other vehicle controllers including the sensors 380 (e.g., wheel speeds, vehicle slope estimates, etc.) and to independently determine one or more of the vehicle characteristics (e.g., wheel slip, vehicle speed, vehicle acceleration, vehicle slope, yaw).

It will also be appreciated that all or portions of the control unit 356 of the differential assembly 352 associated with the front axle assembly 314 could be packaged with the control unit 356 of the rear axle assembly 316 (or vice versa) to permit the control units 356 to be jointly packaged/housed in whole or in part, and/or to share various resources (e.g., memory, processors, ASICs, inputs, outputs).

Some of the vehicle data identified above may be related to the vehicle speed and the longitudinal acceleration of the vehicle. The vehicle speed may be calculated using wheel speeds from each of the four vehicle wheels. The wheel speeds may be determined from signals provided by the vehicle sensors 380 including wheel speed sensors. The vehicle sensors 380 can also include a longitudinal vehicle acceleration sensor. In one example, the four wheel speeds are averaged if the vehicle is in a stable driving condition (where the respective wheel speeds are within a threshold of the vehicle reference speed). If two wheels are slipping relative to the calculated vehicle reference speed plus a threshold, the slowest two wheels are averaged into the vehicle reference speed calculation. If three or four wheels are slipping relative to the vehicle reference speed plus a threshold, then the longitudinal acceleration sensor is integrated and averaged into the reference speed calculation.

The vehicle slope estimate can compare the longitudinal acceleration of the vehicle 300 (such as obtained by the longitudinal vehicle acceleration sensor) to the wheel acceleration (such as obtained by the wheel speed sensors). In another configuration, a calculated acceleration based on engine torque can also be used in addition to or in lieu of the wheel acceleration. The difference between the longitudinal acceleration signal and the wheel acceleration is due to the percent slope affecting the longitudinal acceleration sensor. The values can be filtered to improve accuracy due to the transient conditions such as wheels running over a rough surface, suspension oscillations, etc.

The vehicle sensors 380 can further include a yaw rate sensor. The yaw rate sensor can be a laterally-oriented acceleration sensor. In one example, the control methodology of the instant disclosure can include a yaw rate damping routine. The yaw rate damping routine assists the control methodology to not be highly sensitive to calculated changes in yaw rate to guard against the cycling of the locking mechanism 400 in an oscillatory manner. A yaw rate error can be determined that is based on a comparison of a yaw rate reference calculation and the yaw rate sensor signal value. The yaw rate reference is calculated using the vehicle reference speed and the vehicle steering angle. The yaw rate damping routine is based on the yaw rate error exceeding an entry threshold, which would initiate a locking command until the yaw rate error is less than an exit threshold. In other examples, the determination that wheel slip is less than a wheels slip threshold may also be used as a criteria.

Figure 3:
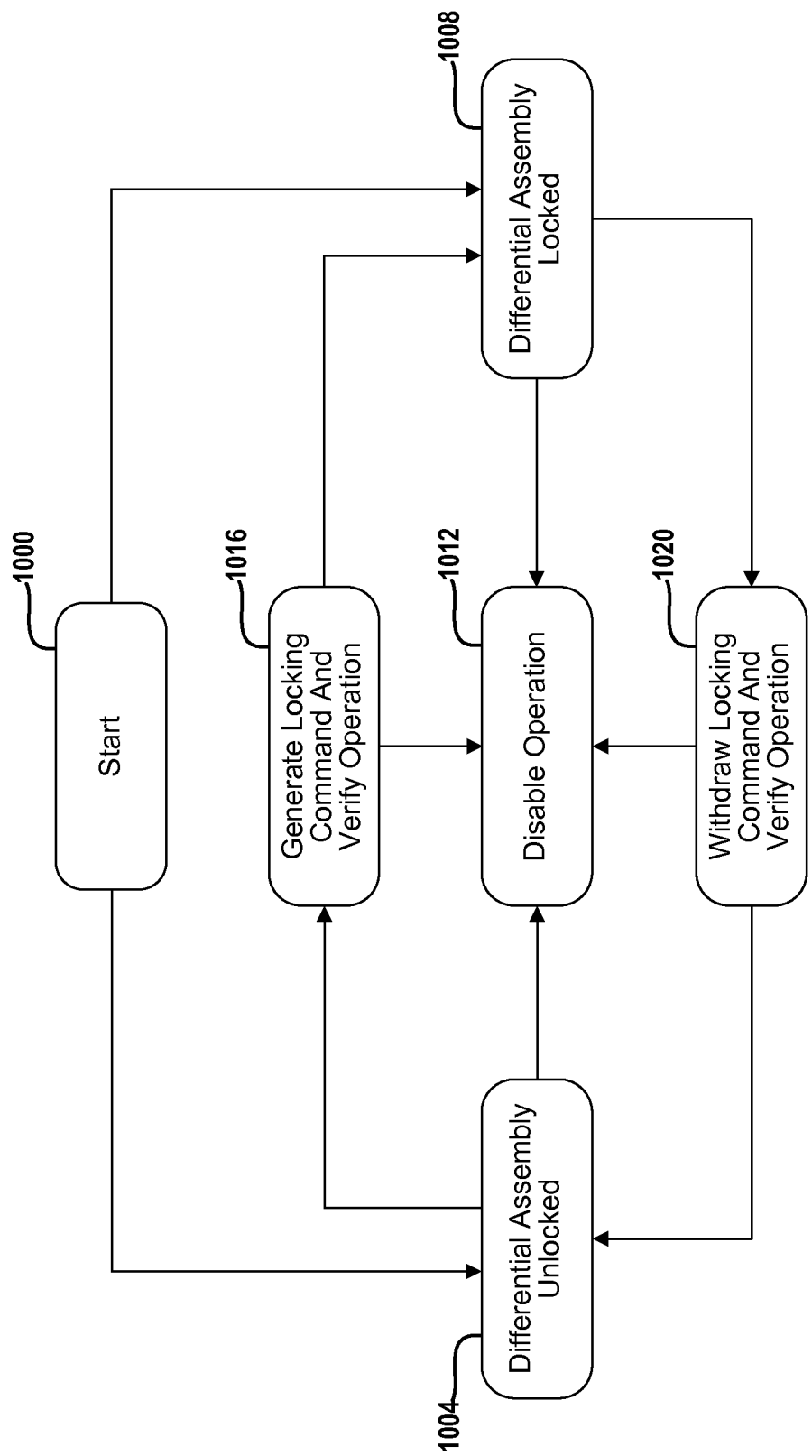
FIG. 3 is a schematic illustration of a state diagram that depicts the operation of a control methodology performed in accordance with the teachings of the present disclosure.

With reference to FIG. 3, a state diagram that schematically depicts an exemplary methodology in accordance with the teachings of the present disclosure is illustrated. With additional reference to FIG. 1, the state diagram begins at block 1000 with the energization of the control units 356 that are employed to monitor and control the operation of front and rear axle assemblies 314 and 316. Each control unit 356 is configured to evaluate the operational state of an associated differential assembly 352. For example, if control determines through the evaluation that the differential assembly 352 of the rear axle assembly 316 is in unlocked state so that the differential assembly 352 operates the manner that permits speed differentiation, control proceeds to block 1004, whereas if control determines through the evaluation that the differential assembly 352 of the rear axle assembly 316 is in a locked state so that the differential assembly 352 operates in the locked manner, control proceeds to block 1008.

In block 1004, control determines whether the operational state of the associated differential assembly 352 is correct and waits for activity that would warrant a change in the operational state of the associated differential assembly 352. If the operational state of the associated differential assembly 352 is not correct in block 1004, control proceeds to block 1012 and operates a routine that can notify the operator of the vehicle 300 of a problem with the differential assembly 352, as well as disable the actuator 400 (FIG. 2) and/or inhibit the generation of a locking command so that the actuator 400 (FIG. 2) of the differential assembly 352 is not operated. Depending on the configuration of the actuator 400 (FIG. 2), the disabling of the actuator 400 (FIG. 2) may permit the differential assembly 352 to operate in the unlocked manner (e.g., through retraction of a first locking dog by a biasing spring disposed between the first locking dog and a second locking dog). Returning to block 1004, if the operational state of the associated differential assembly 352 is correct, control waits for a situation in which the generation of a locking command would be appropriate. Once a situation is encountered in which the generation of a locking command would be appropriate, control proceeds to block 1016. It will be appreciated that while waiting in block 1004 for a situation in which the generation of a locking command would be appropriate, control may also re-determine on a periodic basis whether or not the operational state of the associated differential 352 is correct.

In block 1016, control can generate the locking command and can determine whether the differential assembly 352 is operating in the locked manner. If the differential assembly 352 is not operating in the locked manner, control proceeds to block 1012. If the differential assembly 352 is operating in the locked manner, control proceeds to block 1008.

In block 1008, control waits for a situation in which the withdrawal of the locking command would be appropriate. Once a situation is encountered in which the withdrawal of a locking command would be appropriate, control proceeds to block 1020. It will be appreciated that while waiting in block 1008 for a situation in which the generation of a locking command would be appropriate, control may also re-determine on a periodic basis whether or not the operational state of the associated differential 352 is correct and if it is not, control can proceed to block 1012.

In block 1020, control can withdraw the locking command and can determine whether the differential assembly 352 is operating in the unlocked manner. If the differential assembly 352 is not operating in the unlocked manner, control proceeds to block 1012. If the differential assembly 352 is operating in the unlocked manner, control proceeds to block 1004.

Figure 4:
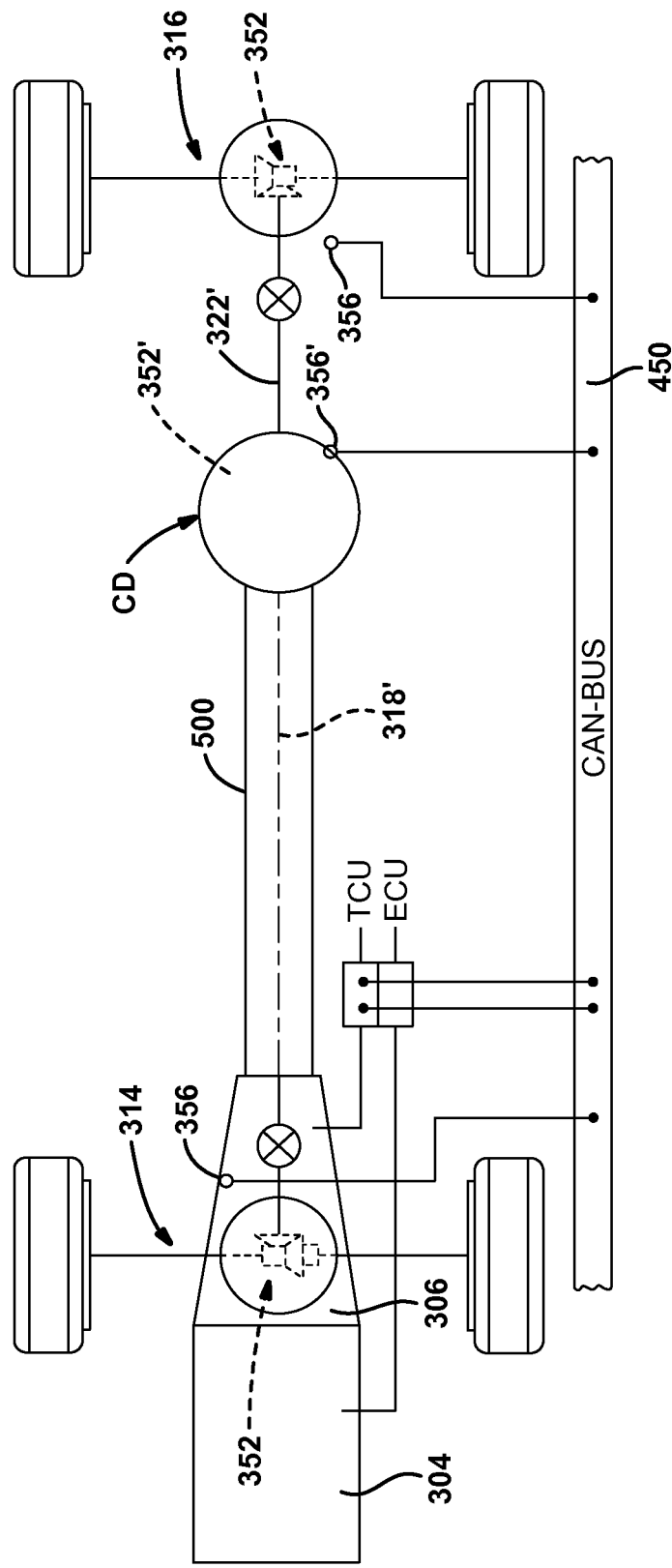
FIG. 4 is a schematic illustration of another vehicle constructed in accordance with the teachings of the present disclosure.

While the vehicle 300 has been depicted with lock-able differential assemblies associated with front and rear axle assemblies and a transfer case that controls the transmission of rotary power to the front and rear axle assemblies, it will be appreciated that a selectively lock-able center differential can be employed in lieu of the transfer case and that the teachings of the present disclosure could be employed to control the operation of the center differential as is illustrated in FIG. 4. In this example, an output member of the transmission 306 provides rotary power to a center differential CD via a hollow propshaft 500. First and second propeller shafts 318' and 322' transmit rotary power from the center differential CD to the front and rear axle assemblies 314 and 316, respectively. The center differential CD includes a differential assembly 352' and a control unit 356' that can be employed to control and monitor the operational state of the differential assembly 352'. As in the prior example, the control unit 356' can receive a lock request, which could be manually generated by the vehicle operator, and can responsively generate a lock command that is employed to cause the differential assembly 352' to operate in the locked manner. Additionally or alternatively, the control unit 356' can sua sponte generate the lock command based on various vehicle data. It will be appreciated that the control unit 356' can be coupled to a CAN-bus 450 to communicate with various vehicle controllers, such as an engine control unit ECU, a transmission control unit TCU, and the control units 356 associated with the front and rear axle assemblies 314 and 316.

Accordingly, it will be appreciated that the vehicle can be operated in a mode in which the differential assemblies 352 associated with the front and rear axle assemblies 314 and 316 and the differential assembly 352' associated with the center differential CD are operated in the unlocked manner; or a mode in which the differential assemblies 352 associated with the front and rear axle assemblies 314 and 316 are operated in the locked manner and the differential assembly 352' associated with the center differential CD is operated in an unlocked manner; or a mode in which the differential assemblies 352 associated with the front and rear axle assemblies 314 and 316 and the differential assembly 352' associated with the center differential CD are operated in the locked manner.

It may be helpful in some situations to include a coupling in the torque transmission path between the differential assembly and a driven wheel that would limit the torque carrying capability of all or portions of the drive train of the vehicle. For example, one or more torque clutches could be employed to limit the torque carrying capability of a propeller shaft or the axle shafts that receive rotary power from a differential assembly. The torque clutch(es) can be employed in the locking mechanism of the differential assembly, in-line with the propeller shafts (e.g., between the differential assembly and a propeller shaft or between the propeller shaft and an input of an axle assembly), or between a differential assembly and a driven wheel.

Other torque limiting mechanisms could be employed in addition to or in lieu of a torque clutch. For example, a torque limiting mechanism having a mechanical fuse can be constructed with load bearing elements that can be configured to fail (e.g., shear) in response to the transmission of torque in excess of a predetermined threshold. Depending on the configuration and location of such torque limiting mechanism, the associated differential assembly may then operate in an unlocked manner only, or may be disabled such that no power is transmitted into the associated differential assembly. Examples of such torque limiting mechanisms can be found in U.S. Pat. Nos. 2,384,188; 2,680,359; 3,973,412; and 4,292,819, the disclosures of which are hereby incorporated by reference as if fully set forth in detail herein.

As another alternative, one or more sensors may be employed to sense the magnitude of the torque that is transmitted through a component of the drive train (e.g., propeller shafts, axle shafts) and generate a sensor signal in response thereto. An associated control unit can receive such sensor signals and can control the actuator that is employed to lock the differential assembly if desired. Exemplary sensors include eddy current torque sensors, magnetostrictive torque sensors, and piezo-electric (e.g., SAW) torque sensors.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A drive train for a vehicle, the drive train comprising:
 a first locking differential having a first locking mechanism; and
 a control unit for controlling operation of the first locking differential, the control unit being responsive to selected vehicle characteristics to sua sponte activate the first locking mechanism of the first locking differential to cause the first locking differential to operate in a locked manner when each of the selected vehicle characteristics is wholly within predefined first limits, wherein the predefined first limits include:
 (i) throttle position less than or equal to 12% of full throttle,
 (ii) steering wheel angle less than or equal to 1.57 rad if the vehicle is traveling in a forward direction and less than or equal to 0.78 rad if the vehicle is traveling in a reverse direction,
 (iii) slip of at least one wheel greater than or equal to 0.35 m/s and less than or equal to 2.00 m/s,
 (iv) vehicle acceleration greater than or equal to 1.2 m/s$^2$ and less than or equal to 20 m/s$^2$,
 (v) vehicle speed less than or equal to 8.9 m/s, and
 (vi) vehicle yaw less than or equal to 0.2 rad/sec,
the control unit being further responsive to the selected vehicle characteristics to sua sponte inactivate the first locking mechanism of the first locking differential to cause the first locking differential to operate in an unlocked manner when any one or more of the selected vehicle characteristics is/are not wholly within predefined second limits, wherein the predefined second limits include:
 (i) throttle position less than or equal to 12% of full throttle,
 (ii) steering wheel angle less than or equal to 1.57 rad if the vehicle is traveling in a forward direction and less than or equal to 0.78 rad if the vehicle is traveling in a reverse direction,
 (iii) slip of at least one wheel greater than or equal to 0.35 m/s and less than or equal to 2.00 m/s,
 (iv) vehicle acceleration greater than or equal to 1.2 m/s$^2$ and less than or equal to 20 m/s$^2$, (v) vehicle speed less than or equal to 10.22 m/s, and (vi) vehicle yaw less than or equal to 0.2 rad/sec.

2. The drive train of claim 1, further comprising a first axle assembly including an axle housing and a first pair of axle shafts, wherein the axle housing houses the first locking differential.

3. The drive train of claim 2 wherein the first pair of axle shafts are coupled to opposite sides of the first locking differential.

4. The drive train of claim 3 wherein the first locking differential is configured to receive a first rotary input from a first propeller shaft and selectively transmit the first rotary input to the first pair of axle shafts in one of the locked or unlocked manner.

5. The drive train of claim 4, further comprising a second axle assembly having a second differential having a second locking mechanism, the second axle assembly having a second pair of axle shafts, wherein the control unit is responsive to the vehicle characteristics to sua sponte activate or inactivate the second locking mechanism of the second locking differential to cause the second locking differential to operate in a locked manner or an unlocked manner, respectively.

6. The drive train of claim 1, wherein the control unit communicates with a differential sensor that is configured to sense a parameter indicative of the operational state of the locking differential.

7. The drive train of claim 6, wherein the control unit is configured to activate the locking mechanism in response to a control signal generated by operation of one of a manually actuated switch or a shift into a four-wheel drive mode.

8. The drive train of claim 7, wherein the control unit is configured to inactivate the locking mechanism in response to a control signal generated by operation of one of a manually actuated switch or a shift into a four-wheel drive mode.

9. The drive train of claim 1 wherein the selected vehicle characteristics include an identification that the vehicle is ascending a hill.

\* \* \* \* \*